US011863418B2

(12) United States Patent
Yamashita

(10) Patent No.: US 11,863,418 B2
(45) Date of Patent: Jan. 2, 2024

(54) ANOMALY DETECTION METHOD AND STORAGE MEDIUM

(71) Applicant: FUJITSU LIMITED, Kawasaki (JP)

(72) Inventor: Shinji Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 17/193,746

(22) Filed: Mar. 5, 2021

(65) Prior Publication Data
US 2021/0367875 A1  Nov. 25, 2021

(30) Foreign Application Priority Data
May 19, 2020 (JP) ................. 2020-087677

(51) Int. Cl.
H04L 43/16 (2022.01)
H04L 43/067 (2022.01)
(Continued)

(52) U.S. Cl.
CPC ............ *H04L 43/16* (2013.01); *H04L 43/062* (2013.01); *H04L 43/067* (2013.01); *H04L 43/0876* (2013.01)

(58) Field of Classification Search
CPC ..... H04L 43/16; H04L 43/062; H04L 43/067; H04L 43/0876; H04L 41/149; H04L 43/08; H04L 63/1425; G06F 21/55
See application file for complete search history.

(56) References Cited

U.S. PATENT DOCUMENTS

2015/0281008 A1* 10/2015 Kumar .................... H04L 43/04
709/224
2016/0050132 A1* 2/2016 Zhang .................... H04L 43/16
370/252
(Continued)

FOREIGN PATENT DOCUMENTS

EP        3454264 A1     3/2019
JP     2011-129071 A     6/2011
(Continued)

OTHER PUBLICATIONS

Andryukhin, Evgeny V. et al., "Industrial Network Anomaly Behavior Detection via Exponential Smoothing Model", 2018 IEEE Conference of Russian Young Researchers in Electrical and Electronic Engineering(EICONRUS), IEEE, Jan. 29, 2018, pp. 1458-1462, XP033330951.
(Continued)

Primary Examiner — Abdulkader M Alriyashi
(74) Attorney, Agent, or Firm — Fujitsu Intellectual Property Center

(57) ABSTRACT

An anomaly detection method executed by a computer, the anomaly detection method includes identifying, for each of target periods, a prediction value to be a reference for determining whether an anomaly occurs in the target period; identifying a corrected prediction value acquired by correcting the prediction value of a first target period based on the prediction value and a measured values of a second target period before the first target period; setting one of the prediction value and the corrected prediction value corresponding to the first target period as an upper limit value and the other as a lower limit value; and determining whether the anomaly occurs in the first target period by using a reference defined by the upper limit value and the lower limit value.

10 Claims, 17 Drawing Sheets

(51) Int. Cl.
*H04L 43/062* (2022.01)
*H04L 43/0876* (2022.01)

(56) References Cited

U.S. PATENT DOCUMENTS

| | | |
|---|---|---|
| 2018/0337832 A1 | 11/2018 | Yamashita |
| 2018/0337837 A1 | 11/2018 | Endo et al. |
| 2019/0373007 A1* | 12/2019 | Salunke ................ G06F 11/323 |
| 2019/0385294 A1* | 12/2019 | Yasukawa ............. G01D 4/008 |
| 2021/0203576 A1* | 7/2021 | Padfield ................. H04L 41/16 |

FOREIGN PATENT DOCUMENTS

| | | |
|---|---|---|
| JP | 2011-250201 A | 12/2011 |
| JP | 2018-195929 A | 12/2018 |

OTHER PUBLICATIONS

Extended European Search Report dated Aug. 6, 2021 for corresponding European Patent Application No. 21159237.3, 7 pages. Please note US-2018/0337832-A1 cited herewith, was previously cited in an IDS filed on Mar. 5, 2021.

* cited by examiner

| | ACTUALLY MEASURED VALUE | PREDICTION VALUE | RATIO | | RATIO | ASCENDING ORDER |
|---|---|---|---|---|---|---|
| 5/27/2019 10:00 | 3.15E+10 | 2.84E+10 | 1.113 | | 1.147 | ⎫ TOP 10% |
| 5/27/2019 10:10 | 1.08E+10 | 2.74E+10 | 1.127 | | 1.146 | ⎭ |
| 5/27/2019 10:20 | 3.07E+10 | 2.67E+10 | 1.147 | | 1.132 | |
| 5/27/2019 10:30 | 2.91E+10 | 2.66E+10 | 1.094 | | 1.132 | |
| 5/27/2019 10:40 | 3.08E+10 | 2.68E+10 | 1.146 | | 1.127 | |
| 5/27/2019 10:50 | 2.98E+10 | 2.72E+10 | 1.096 | | 1.113 | |
| 5/27/2019 11:00 | 2.97E+10 | 2.74E+10 | 1.082 | | 1.102 | |
| 5/27/2019 11:10 | 3.03E+10 | 2.75E+10 | 1.102 | | 1.096 | |
| 5/27/2019 11:20 | 2.97E+10 | 2.75E+10 | 1.079 | | 1.094 | |
| 5/27/2019 11:30 | 3.06E+10 | 2.71E+10 | 1.132 |  | 1.082 | |
| 5/27/2019 14:00 | 2.61E+10 | 2.48E+10 | 1.052 | | 1.079 | |
| 5/27/2019 14:10 | 2.82E+10 | 2.49E+10 | 1.132 | | 1.073 | |
| 5/27/2019 14:20 | 2.56E+10 | 2.5E+10 | 1.024 | | 1.052 | |
| 5/27/2019 14:30 | 2.45E+10 | 2.52E+10 | 0.971 | | 1.024 | |
| 5/27/2019 14:40 | 2.48E+10 | 2.53E+10 | 0.978 | | 1.019 | |

FIG. 8B

| 5/27/2019 14:50 | 2.54E+10 | 2.54E+10 | 1.001 | | 1.001 | |
|---|---|---|---|---|---|---|
| 5/27/2019 15:00 | 2.35E+10 | 2.51E+10 | 0.933 | | 0.978 | |
| 5/27/2019 15:10 | 2.31E+10 | 2.48E+10 | 0.932 | | 0.971 | |
| 5/27/2019 15:20 | 2.48E+10 | 2.44E+10 | 1.019 | | 0.933 | BOTTOM 10% |
| 5/27/2019 15:30 | 2.6E+10 | 2.42E+10 | 1.073 | | 0.932 | |

ANOMALY DETECTION METHOD AND STORAGE MEDIUM

CROSS-REFERENCE TO RELATED APPLICATION

This application is based upon and claims the benefit of priority of the prior Japanese Patent Application No. 2020-87677, filed on May 19, 2020, the entire contents of which are incorporated herein by reference.

FIELD

The embodiment discussed herein is related to an anomaly detection method and a storage medium.

BACKGROUND

In a network operation, in order to grasp whether a network under control is operating normally, network monitoring for collecting various types of information regularly, and detecting any anomaly at an early stage when an anomaly occurs is desirable. Examples of various types of information include information about network traffic and information about performance of a server under the network such as a CPU usage and a hard disk capacity.

As a technique for detecting such a network anomaly, there is a technique for detecting a traffic anomaly using a threshold value indicating a fluctuation tolerance that defines a range in which the traffic fluctuation is allowed. In this technique, a threshold value indicating a fluctuation tolerance of traffic is predicted based on traffic that has a fluctuation distribution similar to a fluctuation distribution of the traffic at the monitoring target date and time, out of the traffic for a past predetermined time range for each attribute of the route information. Therefore, it is detected whether the traffic at the monitoring target date and time is within a threshold range for each attribute of the route information. For example, Japanese Laid-open Patent Publication No. 2011-250201, Japanese Laid-open Patent Publication No. 2018-195929, and the like are disclosed as related art.

SUMMARY

According to an aspect of the embodiments, an anomaly detection method executed by a computer, the anomaly detection method includes identifying, for each of target periods, a prediction value to be a reference for determining whether an anomaly occurs in the target period; identifying a corrected prediction value acquired by correcting the prediction value of a first target period based on the prediction value and a measured values of a second target period before the first target period; setting one of the prediction value and the corrected prediction value corresponding to the first target period as an upper limit value and the other as a lower limit value; and determining whether the anomaly occurs in the first target period by using a reference defined by the upper limit value and the lower limit value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 8A and 8B are a diagram illustrating an example of data of actually measured values and prediction values of the reference period used for calculation of the correction coefficient $\alpha_x$;

DESCRIPTION OF EMBODIMENTS

Figure 1:
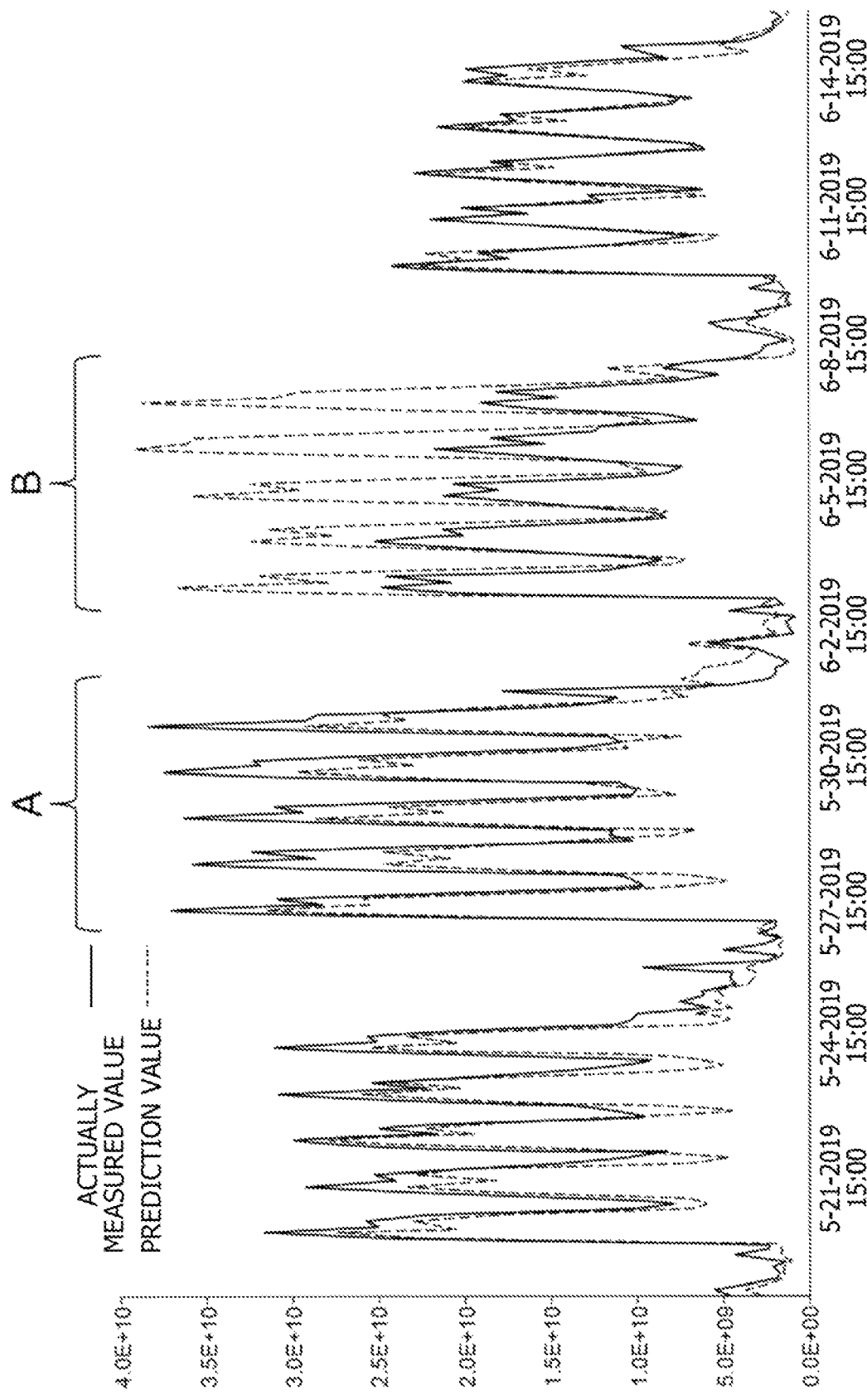
FIG. 1 is an application example of the reference technique, and is a diagram illustrating an example of a graph comparing the calculated prediction values and the actually measured values.

As described above, there is a method of detecting a network anomaly using a threshold value indicating a predicted fluctuation tolerance. For the prediction of the threshold value, for example, specific traffic volumes of a predetermined period of a past date and time are used. The average of specific traffic volumes is used as the reference of the fluctuation tolerance, and a predetermined margin is taken from this average to acquire the upper limit threshold value and the lower limit threshold value.

However, the actual traffic volume may trend to be different from the average of the specific traffic volumes used as the reference of the fluctuation tolerance, that is, the predicted traffic volume. For example, in the case of network routes used for business, it is conceivable that the trend of the actual traffic volume may differ from that of the predicted traffic volume according to the season of the business or the change in work styles. From the viewpoint of business season, when the business volume is higher than expected in the busy season of the business, the traffic volume becomes higher than the prediction. Furthermore, when the business volume is lower than expected in the slack season of the business, the traffic volume becomes lower than expected. Furthermore, from the viewpoint of the change in work styles, various cases are expected. For example, in a case where teleworking is started in the middle of the week, it is expected that the traffic volume increases or decreases after the start day according to the business mode. In companies with a high amount of business via the network, it is expected that the traffic volume trends to increase, and in companies with a small amount of business via the network, it is expected that the traffic volume trends to decrease. Similarly, in a case where teleworking is performed until the middle of the week and working style is switched to working in the office from the middle of the week, the traffic volume trend may fluctuate. It is expected that other than teleworking, changes in work styles such as waiting at home and reassignment of personnel may cause various fluctuation in traffic volume trend. As described, the traffic volume trend may fluctuate according to the change in business season or the work style, that is, the actual traffic volume may stay higher or lower than the predicted traffic volume.

When the traffic volume trend fluctuates as described above, the predicted traffic volume and the actual traffic volume deviate from each other. When such a deviation occurs, an increase or decrease in the traffic volume that would not have been detected as an anomaly without the deviation may be detected as an anomaly. However, such an increase or decrease in the traffic volume is a traffic fluctuation that is not originally regarded as an anomaly, and thus an unnecessary anomaly is detected, If any unnecessary anomaly detection is performed, there arises a problem that it becomes difficult to identify an anomaly that is originally desired to be detected. In network monitoring, it is desirable to reduce unnecessary anomaly detections as much as possible. However, since such trend fluctuations occur due to sudden circumstances, it is difficult to predict fluctuations in traffic volume trend in advance.

In view of the above, it is desirable to reduce unnecessary anomaly detections and detect appropriate abnormalities so as to deal with fluctuations that are difficult to predict.

Hereinafter, an example of an embodiment according to the disclosure will be described in detail with reference to the drawings.

Before describing the embodiment of the present disclosure in detail, the technique as a premise and the outline of the method of the present embodiment will be described. Note that in the present embodiment, a case of detecting whether there is an anomaly in the traffic in the network will be described as an example, but the application target of the embodiment is not limited to the traffic. For example, it is possible to apply the present disclosure to the CPU usage, hard disk capacity, and the like regarding the server performance of the network, so that it can be detected whether there is an anomaly in the server performance. Furthermore, the present disclosure can be applied not only to network traffic but also to the flow rate of infrastructure such as electric power, water supply, or gas.

First, the technique as a premise will be described. As a technique for detecting a traffic anomaly in a network, there is a technique described in Patent Document 2 or the like developed by the inventor of the present disclosure or the like (hereinafter referred to as a reference technique).

In the reference technique, the fluctuation tolerance that defines the allowable range of traffic fluctuation, that is, the prediction values that are the references of the normal range are calculated as a time-series waveform from the traffic model based on the past actually measured values of the traffic volume. Whether there is an anomaly is determined by determining whether the traffic is within the normal range. The actually measured values indicate the traffic volumes actually measured. Then, the calculated prediction values are compared with the actually measured values to detect an anomaly. In the present embodiment, the prediction values and the method of detecting an anomaly of the reference technique are used as a base. Thus, a specific method of calculating the prediction values and a specific method of detecting an anomaly will be described.

A traffic model is used to calculate the prediction values. As the traffic model, a traffic model using an autoregressive sum of extensions moving average, a traffic model using a regression line, or the like can be used. As the learning data of the traffic model, the traffic volume actually measured for the route of a certain network for each unit time is used. For example, in a case where the unit time is 10 minutes, the sampling time is set every 10 minutes. When the sampling time is 10:00, the measurement result of the traffic volume (Mbps) measured at 10:00 is used as the learning data at 10:00. The average traffic volume during a unit time may be used as learning data, In this case, when the sampling time is 10:00, the average of the traffic volumes sampled at any intervals (for example, every 1 minute, every 2 minutes, etc.) between 9:50 and 10:00 may be used as Learning data at 10:00.

The traffic model is generated by using the transition of the traffic volume in a certain learning period as learning data. For example, a traffic model of autoregressive sum of extensions moving average can be expressed as $x(t)=\beta_1(t-1)+\beta_2(t-2)+\ldots+\beta_n(t-n)$. $n$ ($n=1, 2, 3, \ldots$) represents the number of a week unit of a learning period, and t represents the start point of time of a prediction period of a week unit. If $n=4$, the learning period is four weeks prior to the start point of time of the prediction period. $\beta_n$ is a coefficient that is the degree of influence on the traffic model for each week, and any value is used. $\beta_1(t-1)$ represents the coefficient from one week before the start point of time to the start point of time. $\beta_2(t-2)$ represents the coefficient from two weeks before the start point of time to one week before the start point of time. When acquiring prediction values, for example, traffic volumes sampled at predetermined time within the prediction period are acquired from the transition of the autoregressive sum of extensions moving average of the traffic model generated from the learning data during the learning period, and the traffic volumes are set as the prediction values. For example, if the learning period is four weeks and the prediction period is three weeks, a traffic model is generated using the learning data for the four weeks prior to the start point of time of the prediction period as a reference, and from the generated traffic model, the prediction values within three weeks from the start point of time are acquired. By thus generating a traffic model from the learning data of week units and acquiring the prediction values, the prediction values reflecting the trend of each day of the week can be acquired. Note that the learning period and the prediction period are examples, and any they can be defined as any periods. Furthermore, 10 minutes as a unit is an example, and any unit time such as 1 minute, 5 minutes, 15 minutes, 20 minutes, etc. can be set. The transition of the traffic volume during the above-described learning period is an example of the past actually measured values of the present disclosure.

Here, the case where the predicted traffic volume and the actual traffic volume deviate from each other described in the above-described problem corresponds to the case where the prediction values and the actually measured values deviate from each other in the reference technique. FIG. 1 is an application example of the reference technique, and is a diagram illustrating an example of a graph comparing the calculated prediction values and the actually measured values. In FIG. 1, the vertical axis represents the traffic volume and the horizontal axis represents time. The vertical axis represents the traffic volume (Mbps) expressed using a power, and 4.0E+10 indicates 1,048,576 Mbps, which is the 10th power of 4. On the horizontal axis, the date and time is plotted every three days from 15:00 on 2019-5-21 (May 21, 2019). In the example illustrated in FIG. 1, the prediction values and the actually measured values deviate from each other in period A and period B. Period A is a busy season of business and the week of the month-end closing to increase the traffic volume, and the actually measured values and the prediction values deviate from each other such that the actually measured values stay higher than the prediction values. Period B is a week of a next month after the busy season of business and the month-end closing are finished to decrease the traffic volume, and the prediction values and the actually measured values deviate from each other such that the prediction values stay higher than the actually measured values. As described above, different types of deviation occur from period A to period B, which are consecutive periods. Here, with reference to the method of the reference technique, a method of acquiring prediction values with little deviation by making a model that has learned fluctuations in month units or year units can be considered. However, in this case, learning data for several months to several years is required and a long learning period is required, which is disadvantageous.

Figure 2:
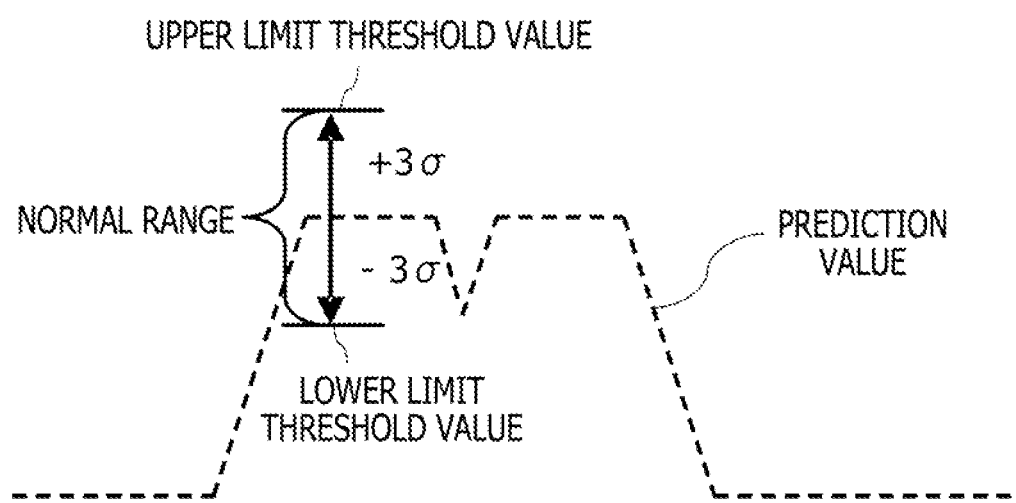
FIG. 2 is a schematic diagram schematically illustrating the relationship between the graph of prediction values and upper and lower limit threshold values.

Next, the method of anomaly detection will be described. An anomaly is detected based on a threshold value set for prediction values as a reference. For example, the prediction values are set by the above-described calculation method, and an upper limit threshold value and a lower limit threshold value are set as threshold values. An anomaly is detected depending on whether the actually measured values are within the normal range defined by the upper limit threshold value and the lower limit threshold value. The upper limit threshold value and the lower limit threshold value are acquired, for example, by using the standard deviation σ acquired from the actually measured values within a past certain period, and the prediction value+3σ is set as the upper limit threshold value and the prediction value −3σ is set as the lower limit threshold value. Since ±3σ is just an example, appropriate upper limit threshold value and lower limit threshold value such as ±2σ and ±4σ may be set. As the standard deviation σ, for example, the standard deviation of the actually measured values within the past five weeks is used. FIG. 2 is a schematic diagram schematically illustrating the relationship between the graph of prediction values and the upper and lower limit threshold values. For convenience of description, the graph in FIG. 2 is a graph that schematically illustrates a waveform graph indicating the traffic volume for each time (the same applies to the following figures). In FIG. 2, the graph of the prediction values is drawn as if the prediction values are constant in the peak time zone, but actually, is a waveform graph in which the values are plotted for each unit time as illustrated in FIG. 1.

FIG. 2 illustrates the upper limit threshold value and the lower limit threshold value with respect to the prediction values of the time in the peak time zone. The normal range defined by the upper limit threshold value and the lower limit threshold value described here is the range of the traffic volume to be determined there is no anomaly at that time. According to the normal range defined by the upper limit threshold value and the lower limit threshold value, if the actually measured values are within the normal range, it is determined that there is no anomaly, and if any of the actually measured values is not within the normal range, it is determined that there is an anomaly. In this way, anomaly detection is performed by determination using the normal range between the upper limit threshold value and the lower limit threshold value. Note that the concept of the normal range is the same for time zones before and after the peak time zone. The technique as a premise has been described.

Next, an outline of the method of the present embodiment will be described.

Assuming that the prediction values and the actually measured values deviate from each other due to the issue of the technique described above as a premise, it is desired to correct the prediction values to make them closer to the actually measured values by a method that does not require a long learning period. If such correction enables adjustment to reduce the deviation, it is considered that appropriate anomaly detection is possible. Therefore, in the method of the present embodiment, corrected prediction values acquired by correcting the prediction values are introduced. Regarding the corrected prediction values, the corrected prediction values of the current day is acquired based on the prediction values and the actually measured values of the previous day (the specific calculation method of the corrected prediction values will be described below). That is, it can be said that the corrected prediction values are prediction values corrected by reflecting the trend of the actual traffic volume on the previous day.

Figure 3:
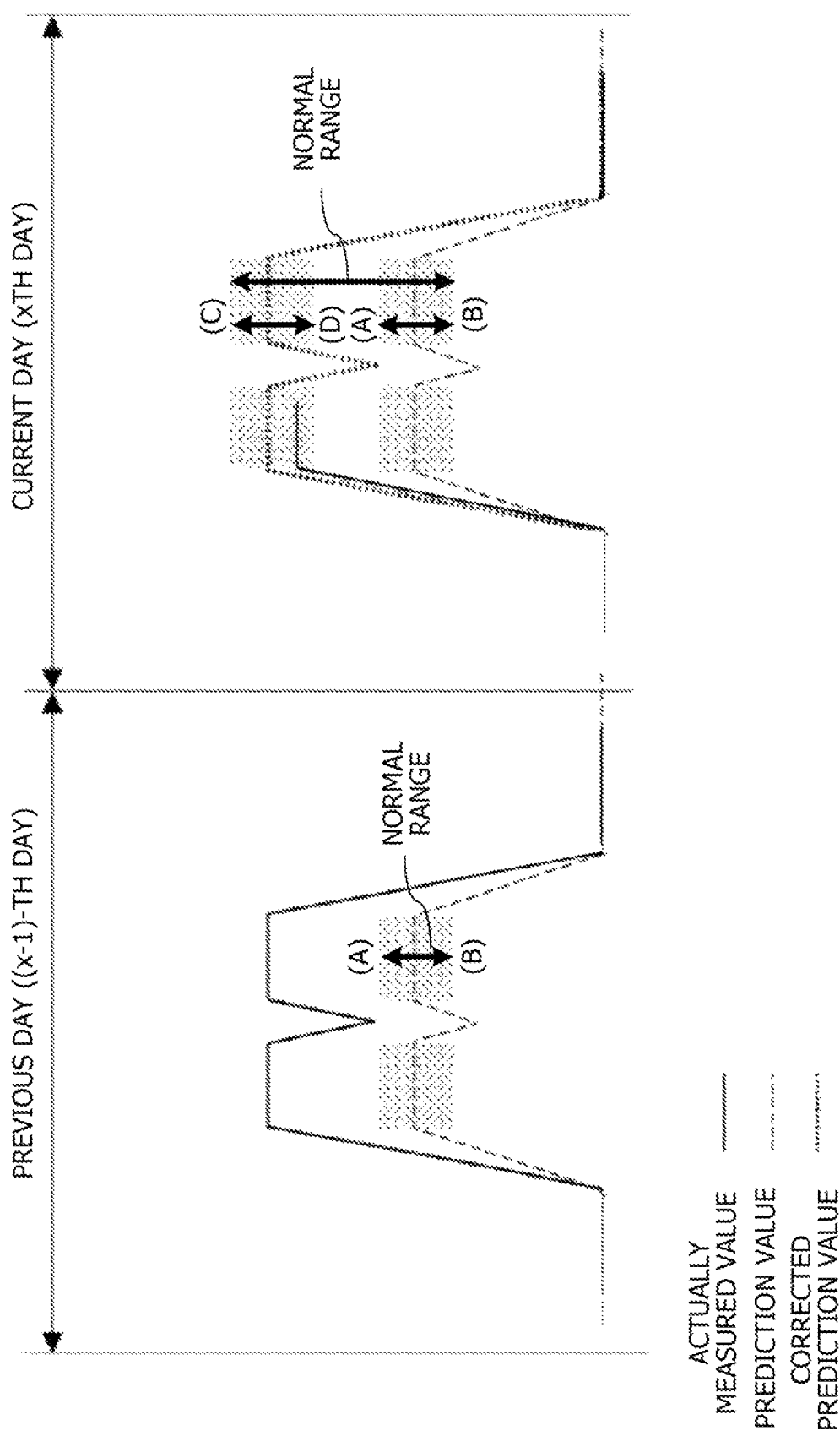
FIG. 3 is a diagram illustrating an example in which corrected prediction values of the current day are acquired based on the prediction values and the actually measured values of the previous day.

FIG. 3 is a diagram illustrating an example of a case where the corrected prediction values of the current day is acquired based on the prediction values and the actually measured values of the previous day. As illustrated in FIG. 3, the corrected prediction values of the current day (xth day in FIG. 3) are acquired based on the prediction values and the actually measured values of the previous day ((x−1)-th day in FIG. 3). In the example of FIG. 3, the actually measured values of the previous day were higher than the prediction values, the corrected prediction values are acquired to be higher than the prediction values. Furthermore, the upper limit threshold value and the lower limit threshold value described above with reference to FIG. 2 are acquired for the prediction values, and also acquired for the corrected prediction values on the previous day and the current day. (A) indicates the upper limit threshold value of the prediction values, (B) indicates the lower limit threshold value of the prediction values, (C) indicates the upper limit threshold value of the corrected prediction values, and (D) indicates the lower limit threshold value of the corrected prediction values. Here, the difference between the normal range of the conventional method and the normal range of the method of the present embodiment will be described. On the previous day, the corrected prediction values have not been acquired yet, and only the prediction values of the conventional method are used, and thus the normal range is from the upper limit threshold value (A) of the prediction values to the lower limit threshold value (B) of the prediction values. On the other hand, once the corrected prediction values are acquired, in the method of the present embodiment, a range from the upper limit threshold value that is higher among those for the prediction values and the corrected prediction values to the lower limit threshold value that is lower is handled as the normal range of the current day. In the case of FIG. 3, the range from the upper limit threshold value (C) of the corrected prediction values to the lower limit threshold value (B) of the prediction values is handled as the normal range. That is, the normal range in the present embodiment is defined based on the difference between the prediction values and the corrected prediction values. Furthermore, it can be said that the normal range of the present embodiment has a wider range than the conventional normal range based only on the prediction values. The reason why the normal range is increased in this way is that the traffic trend may fluctuate according to the business season or the change of work style as described in the above-described problem.

Figure 4:
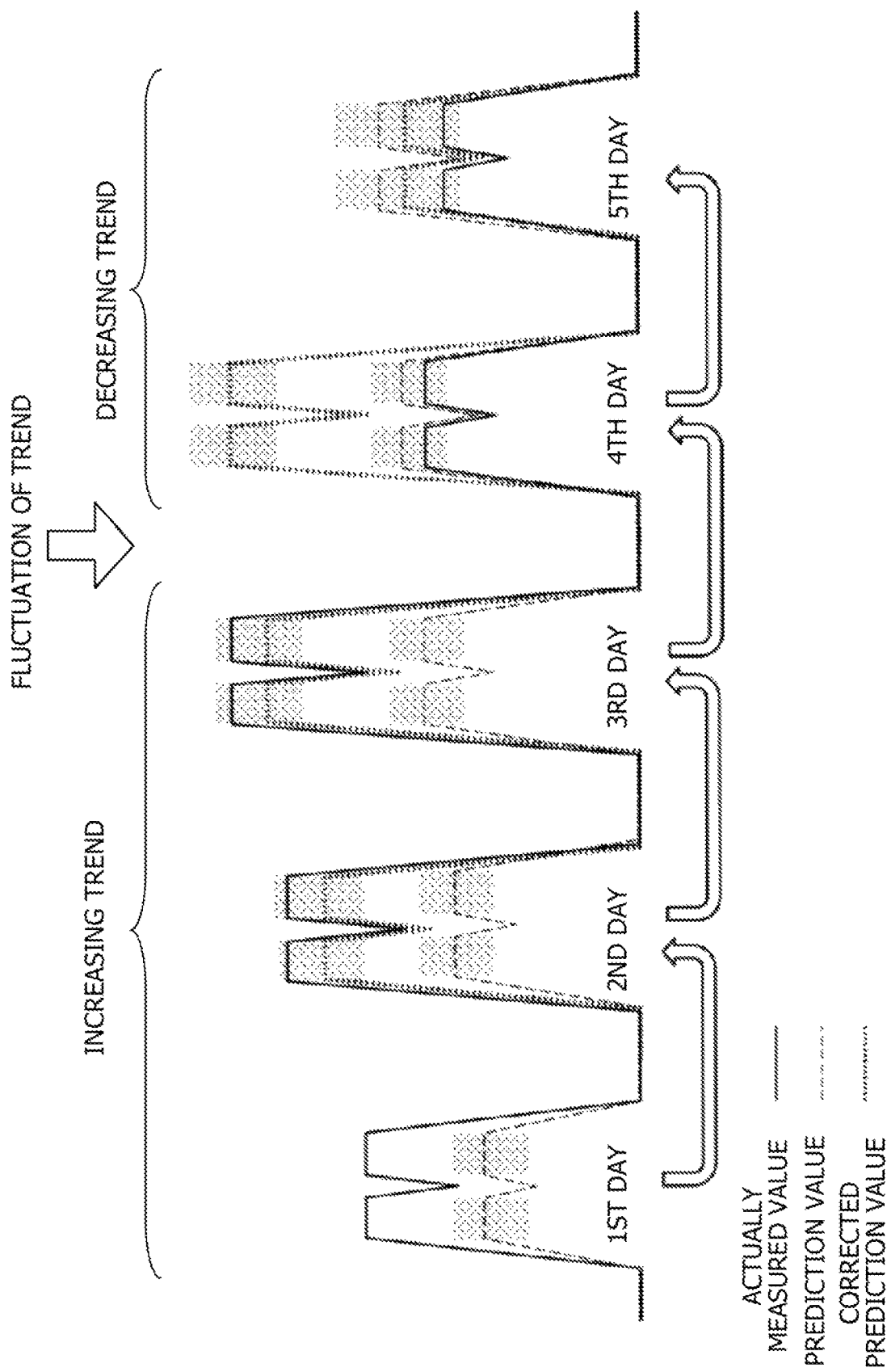
FIG. 4 is a diagram illustrating an example of a case where the traffic volume pattern changes from an increasing trend to a decreasing trend in the middle of the week.

An example of defining the normal range dealing with the fluctuation of the trend will be described. FIG. 4 is a diagram illustrating an example of a case where the traffic volume pattern changes from an increasing trend to a decreasing trend in the middle of the week. In the example illustrated in FIG. 4, it is assumed that the prediction values for 5 days are set in advance based on the past actual data and the like as indicated by the broken line. However, it is assumed that the traffic volume is than the prediction values of the traffic volume and trends to increase from the 1st day to the 3rd day of the week due to, for example, a sudden event such as the fiscal year end. When the anomaly determination using the corrected prediction values is performed, it is possible to reduce inadvertent determination of the increase in the traffic volume due to such a sudden event as an anomaly. However, when, for example, the sudden increase in traffic at the fiscal year end subsides due to the change of month from the 4th day and the traffic volume returns to the normal level, it is determined as abnormal by the anomaly determination using only the corrected prediction values. However, in the method of the present embodiment, the anomaly determination is performed by using the determination of whether the traffic volume is between the corrected prediction values and the prediction values. Thus, incorrect anomaly determination in such a case may be reduced. That is, even when a sudden event subsides and the traffic volume returns to the normal level, the anomaly is determined also using the prediction values of the normal state. Thus, it is possible to deal with the sudden occurrence of an event and subsiding of the event.

In FIG. 4, the actually measured values and the prediction values largely deviate from each other in the increasing trend from the 1st day to the 3rd day, and the corrected prediction values are acquired such that the deviation is compensated. In the case of FIG. 4, the pattern of increasing trend from the 1st day to the 3rd day is grasped, and the corrected prediction values are acquired based on the prediction values and the actually measured values of the previous day. The corrected prediction values from the 2nd day to the 4th day are acquired to be higher than the prediction values. On the other hand, since the pattern changes to a decreasing trend on the 4th day, the corrected prediction values on the 5th day are acquired to be lower than the prediction values. Furthermore, an upper limit threshold value and a lower limit threshold value are acquired for the prediction values, and also acquired for the corrected prediction values. The normal range from the 2nd day to the 4th day is defined by the upper limit threshold value of the corrected prediction values and the lower limit threshold value of the prediction values. The normal range on the 5th day is defined by the upper limit threshold value of the prediction values and the lower limit threshold value of the corrected prediction values.

Figure 5:
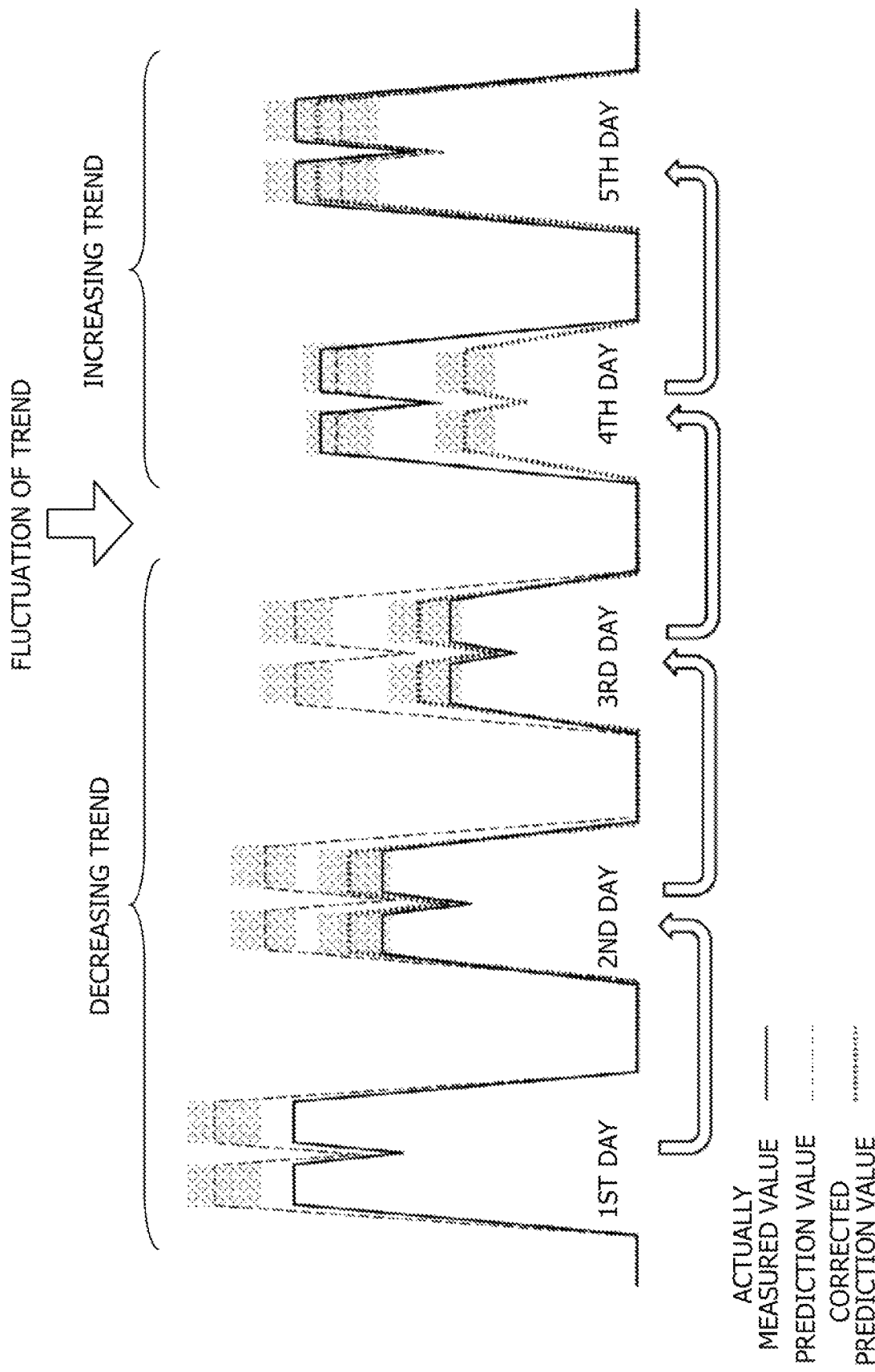
FIG. 5 is a diagram illustrating an example of a case where the traffic volume pattern changes from a decreasing trend to an increasing trend in the middle of the week.

FIG. 5 is a diagram illustrating an example of a case where the traffic volume pattern changes from a decreasing trend to an increasing trend in the middle of the week. In the example illustrated in FIG. 5, the pattern is the opposite of that in FIG. 4, and it is assumed that the traffic volume trends to decrease from the 1st day to the 3rd day of the week. On the other hand, the pattern changes to an increasing trend due to the occurrence of a sudden event on the 4th day. In both cases of FIG. 4 and FIG. 5, it is difficult to predict the fluctuation of the trend due to the occurrence or subsiding of the sudden event in advance. Therefore, the normal range is defined in consideration of both the prediction values and the corrected prediction values so that the trend fluctuates due to a sudden event can be dealt with.

As described above, the normal range is defined based on the difference between the prediction values and the corrected prediction values. Since the corrected prediction values are acquired as values that compensate the deviation between the actually measured values and the prediction values, it can be said that the normal range is proportional to the magnitude of the deviation between the actually measured values and the prediction values. Furthermore, the large deviation indicates that the traffic trend fluctuates significantly. Therefore, in such a highly uncertain situation where the trend fluctuates greatly, the network traffic is monitored with a wider normal range. Therefore, it becomes possible to flexibly deal with the traffic fluctuation that is difficult to predict, and to detect appropriate anomaly without detecting unnecessary abnormalities.

In the present embodiment, a case where a network used for business is used as a target route regarding the target of anomaly detection, and an anomaly in the traffic of the network is detected will be described as an example.

In the present embodiment, the unit period for which the prediction value is acquired is set to every day (every 24 hours), and an anomaly is detected. Here, the terms related to the unit period for anomaly detection in the present embodiment will be summarized, Hereinafter, "target day", "target period", "reference day", and "reference period" will be described as terms related to the unit period.

The "target day" is a day on which an anomaly is detected. In the present embodiment, the corrected prediction value is acquired for each target day for which the prediction value is set. The target day is, for example, a business day when business is performed in a case where anomaly detection is performed in a business network. When Monday to Friday, which are weekdays of the week, are business days, each of the five days from Monday to Friday is set as the target day, If there is a holiday between Monday and Friday, the days excluding the holiday are set as the target days. For example, if Tuesday is a holiday, Monday, Wednesday, Thursday, and Friday are set as the target days. Note that if the network operates all the time regardless of the day of the week, all days of the week may be set as the target days.

The "targets period" is a time zone during which an anomaly is detected out of time zones of the target day. For the target period, for example, a time zone from the start of the business to the end of the business may be set. If the business hours are 10:00-12:00 and 13:00-17:00, each time zone is set as the target period. In this way, any time zone in which the network is used for business is set as the target period to perform anomaly detection. Note that if the network operates all the time, all time zones of the target days may be set as the target periods. The target periods of the target days are an example of the first target period of the disclosed technique.

The "reference day" is a day on which the actually measured values and prediction values are acquired in order to acquire the corrected prediction values. Regarding the reference day, the previous target day may be set as the reference day, and for example, the latest target day may be set as the reference day. In a case where target days are consecutive in a week, if the target day is expressed as xth day, (x−1)-th day is set as the reference day. Note that a plurality of reference days may be set, and for example, two days ((x−1)-th day and (x−2)-th day) that are the latest target days may be set as reference days. Furthermore, when a plurality of reference days is used, weighting or the like may be performed such that the influence of the later reference day becomes larger.

The "reference period" is one or more time zones, out of time zones of the reference day, for acquiring actually measured values and prediction values used for acquiring the corrected prediction values. The reference period is set in this way because it is considered that the deviation between the prediction values and the actually measured values is likely to occur in time zones when the network is intensively used. As the reference period, for example, the peak time zone of business may be set. If the peak time zones are 10:00-11:30 and 14:30-15:30, these time zones are set. By using the actually measured values and the prediction values of such a reference period, corrected prediction values that reduce the deviation from the actually measured values can be acquired, Note that the reference period and the target period may be the same. The reference period is an example of the second target period of the disclosed technique.

Note that in a case where the unit period is not every day but 12 hours, which is shorter than 24 hours, the target period and reference period may be defined as every 12 hours. Similarly, in a case where the unit period is 36 hours, which is longer than 24 hours, the target period and reference period may be defined as every 36 hours. Furthermore, in a case where the unit period is 2 days (48 hours), the target period and reference period may be defined as every 2 days. The same applies to other time intervals. Furthermore, the target period and the reference period may be defined for each target route.

Hereinafter, the configuration and operation of the embodiment of the present disclosure will be described in detail.

Figure 6:
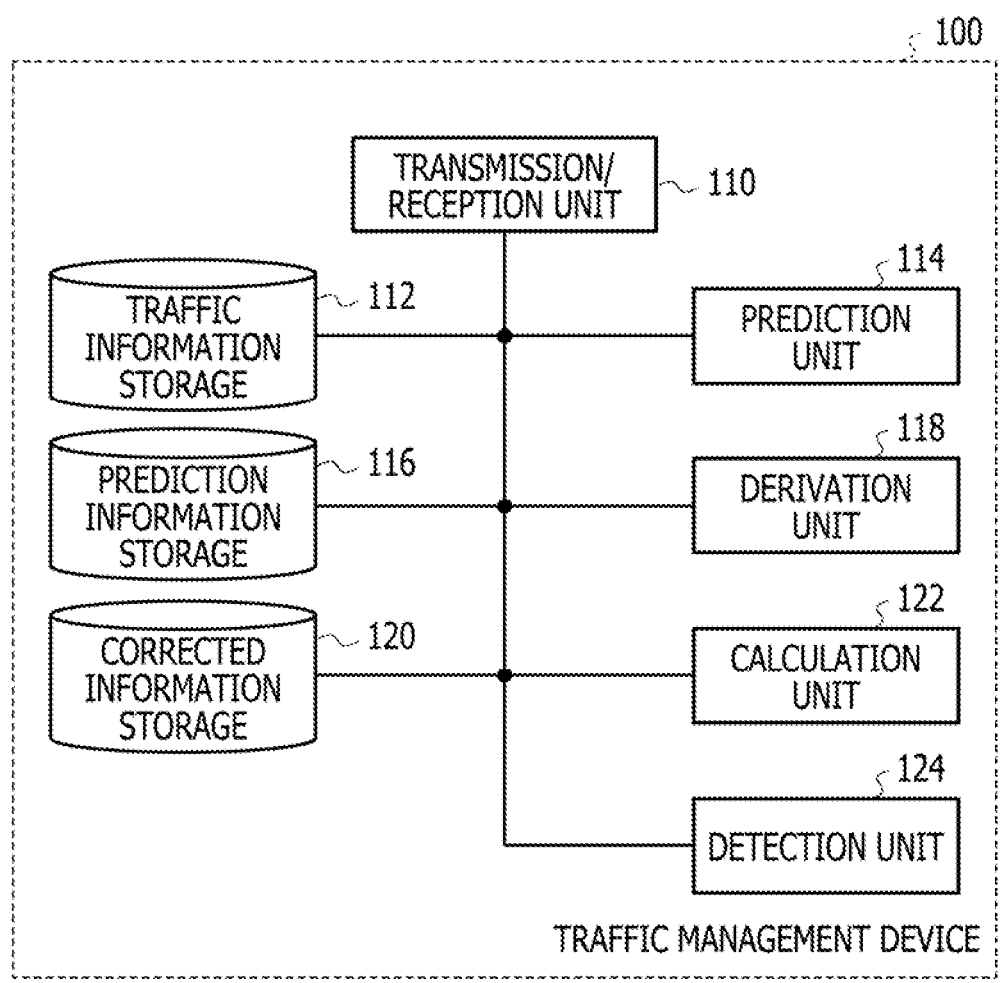
FIG. 6 is a block diagram of a traffic management device according to an embodiment.

As illustrated in FIG. 6, a traffic management device 100 according to the present embodiment includes a transmission/reception unit 110, a traffic information storage 112, a prediction unit 114, a prediction information storage 116, a derivation unit 118, and corrected information storage 120, a calculation unit 122, and a detection unit 124.

The transmission/reception unit 110 transmits a request for traffic information to each route of the network, and receives traffic information from each route. Traffic management device 100 sets each route, from which traffic information is received, as a target route for anomaly detection. The traffic information is information about a route that includes the traffic volume of each route. When the transmission/reception unit 110 receives the traffic information, the transmission/reception unit 110 stores the traffic information in the traffic information storage 112.

In the traffic information storage 112, the traffic information of each target route is stored. In the present embodiment, the traffic volume for each unit time out of the traffic information is treated as an actually measured value.

The prediction unit 114 acquires and stores the prediction values of the traffic for each route. The prediction values may be acquired by using a traffic model based on the past actually measured values and using the method of the above-described reference technique. The prediction values may be acquired in advance before the target day. As described in the above-described example, for example, the actually measured values for the past four weeks from the start point of time of the prediction period are used as learning data to acquire prediction values within three weeks from the start point of time. The traffic model is learned using the traffic information stored in the traffic information storage 112.

In the prediction information storage 116, the traffic model and prediction values of each target route are stored.

The derivation unit 118 multiplies the prediction values by the correction coefficient a, for each target route to acquire the corrected prediction values for the target period, and stores the corrected prediction values in the corrected information storage 120. The correction coefficient $\alpha_x$ is calculated using the average value of the ratio of the actually measured values to the prediction values (actually measured values/prediction values) for each unit time of the reference period based on the actually measured values of the reference period and the prediction values of the reference period. The ratio is a value indicating the magnitude of the deviation between the actually measured values and the prediction values. Hereinafter, the way of acquiring the correction coefficient $\alpha_x$ and the corrected prediction values will be described in detail.

Figure 7:
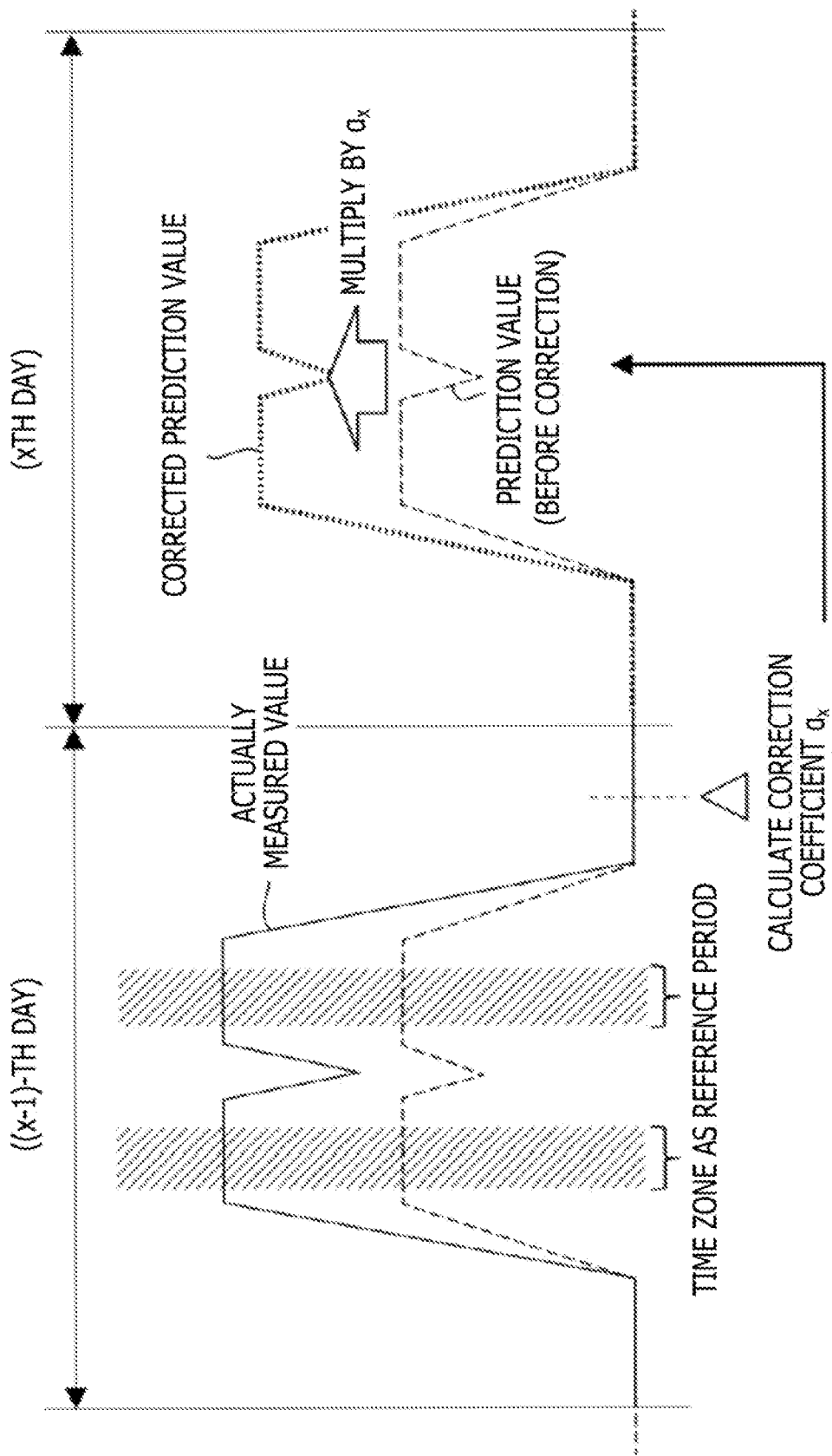
FIG. 7 is a diagram illustrating an example of a case where corrected prediction values are acquired based on a correction coefficient $\alpha_x$.

FIG. 7 is a diagram illustrating an example of a case where the corrected prediction values are acquired based on the correction coefficient $\alpha_x$. In the example of FIG. 7, the target day is expressed as xth day and the reference day is expressed as (x−1)-th day. The correction coefficient $\alpha_x$ is calculated from the actually measured values and the prediction values of the reference period of the reference day ((x−1)-th day). Then, values acquired by multiplying the prediction values of the target day (xth day) by the correction coefficient $\alpha_x$ are calculated as the corrected prediction values. In the case of the example of FIG. 7, the prediction values are less than the actually measured values within the reference period of (x−1)-th day. Thus, the correction coefficient $\alpha_x$ that makes the corrected prediction values of xth day larger than the prediction values is acquired. On xth day, the prediction values are multiplied by the correction coefficient $\alpha_x$ to acquire corrected prediction values larger than the prediction values.

Figure 8A:

FIGS. 8A and 8B are a diagram illustrating an example of data of the actually measured values and the prediction values of the reference period used for calculation of the correction coefficient $\alpha_x$. In the example of FIGS. 8A and 8B, the reference period includes the time zones between 10:00 and 11:30 and between 14:00 and 15:30 on May 27, 2019, and the unit time is 10 minutes, and thus sampling is performed every 10 minutes. The sampling time points are 10:00/10:10/10:20 . . . /11:30, and 14:00/14:10/14:20 . . . /15:30. The traffic volume for each sampling time point is acquired from the traffic information storage 112 as an actually measured value. Furthermore, the average of the traffic volumes during the unit time including the sampling time may be acquired as an actually measured value. If the sampling time is 10:00, the traffic volumes at any intervals (for example, every 1 minute, every 2 minutes, etc.) between 9:50 and 10:00 are acquired from the traffic information storage 112 and the average of the acquired traffic volumes is used as the actually measured value. If the sampling time is 15:30, the average of the traffic volumes at any intervals between 15:20 and 15:30 is acquired from the traffic information storage 112 as the actually measured value. Furthermore, the prediction value for each unit time of the reference period is acquired from the prediction information storage 116. Then, the ratio of the actually measured value to the prediction value is acquired for each sampling time point. At the sampling time of 10:00, the ratio is calculated to be 1.113. Here, data of the actually measured values may include an abnormal value due to a temporary increase or decrease in traffic and the like. Therefore, in order to reduce abnormal values, the acquired ratios are sorted in ascending order and the top 10% and bottom 10% are excluded. Then, the average value of the remaining 80% of the ratios is acquired as the correction coefficient $\alpha_x$. In the example of FIGS. 8A and 8B, the top 10% is an example of the predetermined range including the maximum value of the present disclosure, and the bottom 10% is an example of the predetermined range including the minimum value. Note that the top 10% and the bottom 10% is an example, and other percentages may be used. Furthermore, the ratios may be sorted in descending order instead of ascending order as long as predetermined ranges are excluded similarly.

As described above, the ratio of the actually measured value to the prediction value is acquired for each unit time of the reference period, excluding an abnormal value, and the correction coefficient $\alpha_x$ is acquired as an average of the remaining ratios. Note that the average value of the ratios is an example, and the median value may be used. Furthermore, the time zone and the unit time of this reference period are examples, and other time zone and unit time may be used. Note that in the above description, the case where (actually measured values/prediction values) are used as the ratios of the actually measured values to the prediction values has been described as an example, but the correction coefficient $\alpha_x$ may be acquired by using (prediction values/actually measured values) as the ratios. In this case, the corrected prediction values are acquired by dividing the prediction values by the correction coefficient $\alpha_x$.

Furthermore, for the correction coefficient $\alpha_x$, carry-over setting for each week unit is set in advance. The carry-over setting is a setting that defines whether to reset the correction coefficient $\alpha_x$ without carrying it over to the next week or to carry it over and use the correction coefficient $\alpha_x$. Resetting means that, for example, when Monday is the target day, the corrected prediction value is not used on Monday. That is, in a case of resetting the correction coefficient $\alpha_x$, the correction coefficient $\alpha_x$ is not acquired with any day of the previous week as the reference day. Furthermore, carrying over means that, for example, when Monday is the target day, the correction coefficient $\alpha_x$ acquired using any day of the previous week as the reference day is used as the corrected prediction value of Monday. The reason for introducing the carry-over setting every week as described above is that the trend of traffic fluctuation may differ according to the season. The carry-over setting may be made in advance, or may be automatically made by taking the statistics on the first days of the week. In this way, setting is made such that on a day defined as the first day of the week, the corrected prediction value is not acquired, or the corrected prediction value is acquired using a predetermined day of the previous week as the reference day. Note that Monday, which is the target day, is an example of the day defined as the first day of the week of the present disclosure.

Figure 9:
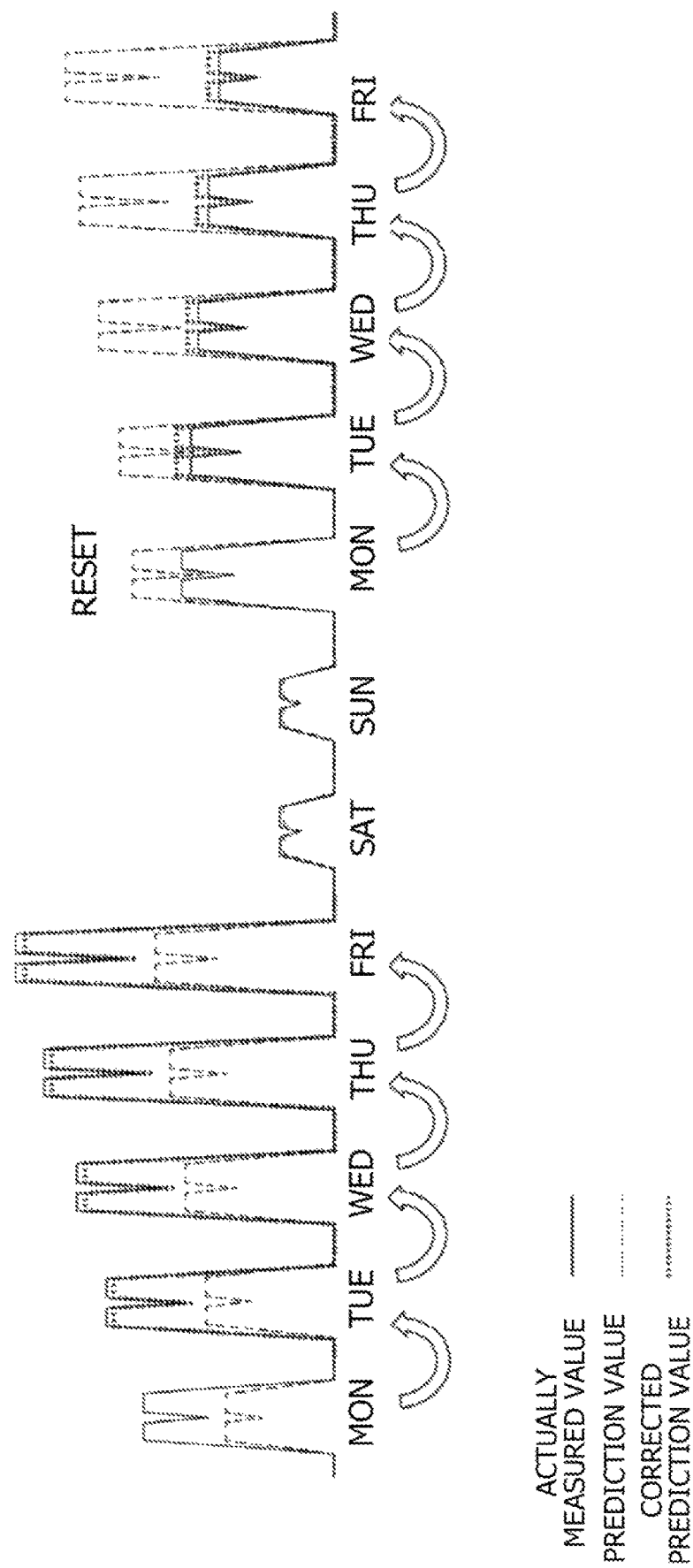
FIG. 9 is a diagram illustrating an example in which reset is performed on the first day of the week and the corrected prediction values are acquired on the next day and the following days.

FIG. 9 is a diagram illustrating an example in which the correction coefficient $\alpha_x$ is reset on the first day of the week and the correction coefficient $\alpha_x$ is acquired on the next day and the following days to acquire the corrected prediction values. In the example illustrated in FIG. 9, the trend indicating that the actually measured values of traffic are larger than the prediction values ends when a week is over, and the actually measured values become smaller. In a case where it is expected that the fluctuation trend of traffic does not continue when a week is over as described above, setting may be made such that the correction coefficient $\alpha_x$ is reset without being carried over. In the example illustrated in FIG. 9, the correction coefficient $\alpha_x$ of the previous week is not carried over, but is reset on the first day and the corrected prediction values are acquired from the next day.

Figure 10:
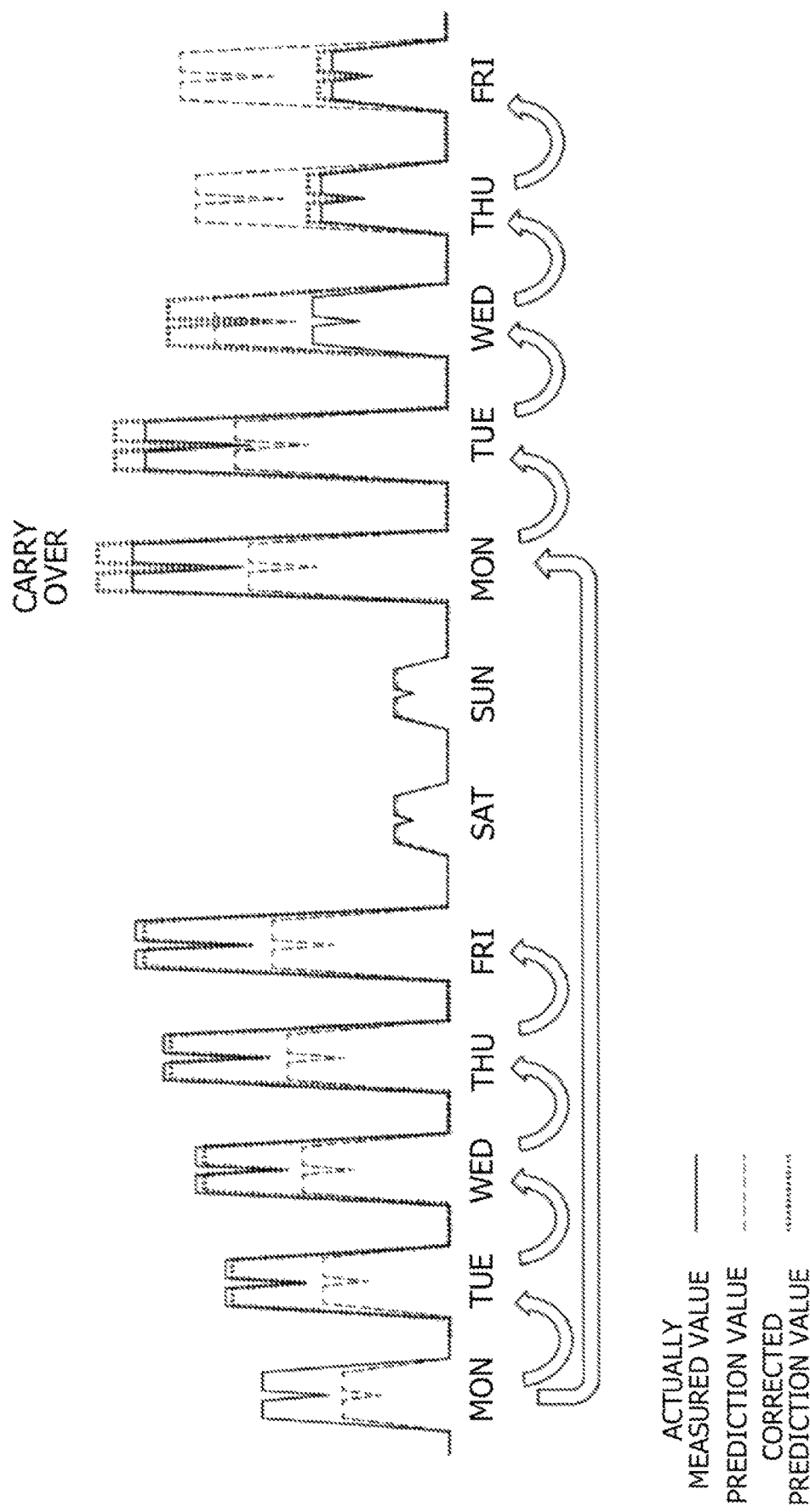
FIG. 10 is a diagram illustrating an example in which the correction coefficient ax of the previous week is carried over to acquire the corrected prediction values.

FIG. 10 is a diagram illustrating an example in which the correction coefficient $\alpha_x$ of the previous week is carried over to acquire the corrected prediction values. In the example illustrated in FIG. 10, the trend indicating that the actually measured values of traffic are larger than the prediction values continues when a week is over. In a case where it is expected that the fluctuation trend of traffic continues when a week is over as described above, setting may be made such that the correction coefficient $\alpha_x$ is not reset and is carried over. In the example of FIG. 10, the correction coefficient $\alpha_x$ of Monday of the previous week is carried over and used to acquire the corrected prediction values. Note that the correction coefficient $\alpha_x$ of any day of the previous week may be carried over, and for example, the correction coefficient $\alpha_x$ of the last target day of the previous week may be carried over. Alternatively, the correction coefficient $\alpha_x$ such as the average of the correction coefficients $\alpha_x$ of the previous week or the median value may be calculated and carried over to the first day of the week.

The way of acquiring the corrected prediction values by the derivation unit 118 has been described above.

In the corrected information storage 120, the correction coefficient $\alpha_x$ and the corrected prediction values for each target route are stored. Furthermore, in the corrected information storage 120, the setting of the normal range for each unit time for each target route calculated by the calculation unit 122 described below is stored. The setting of the normal range includes an upper limit threshold value and a lower limit threshold value that define the normal range.

The calculation unit 122 sets the normal range for each unit time for each target route based on the upper limit threshold value and the lower limit threshold value for the prediction values, and also acquired for the corrected prediction values. The upper limit threshold value and the lower limit threshold value for the prediction values and those for the corrected prediction values may be acquired by using the method of the reference technique and using the standard deviation $\sigma$. For example, regarding the prediction values, "prediction value+3$\sigma$" is set as the upper limit threshold value of the prediction value, and "prediction value−3$\sigma$" is set as the lower limit threshold value of the prediction value. Regarding the corrected prediction values, "corrected prediction value+3$\sigma$" is set as the upper limit threshold value of the corrected prediction value, and "corrected prediction value−3$\sigma$" is set as the lower limit threshold value of the corrected prediction value. The normal range for each unit time is set to a range from the upper limit threshold value that is higher among those of the prediction value and the corrected prediction value to the lower limit threshold value that is lower. In a case where the corrected prediction value>the prediction value is satisfied, the range from the upper limit threshold value of the corrected prediction value to the lower limit threshold value of the prediction value is defined as the normal range. In a case where the corrected prediction value<the prediction value is satisfied, the range from the upper limit threshold value of the prediction value to the lower limit threshold value of the corrected prediction value is defined as the normal range. In this way, the normal range is defined by using one of the prediction value and the corrected prediction value as the upper limit value and the other as the lower limit value. Note that when the prediction value and the corrected prediction value are the same, the upper limit threshold value and the lower limit threshold value of either one may be used because the normal range would be the same.

The detection unit 124 detects an anomaly using the normal range set by the calculation unit 122 for each target route. The anomaly detection method may be based on the method of the above-described reference technique, and the detection unit 124 determines, for each unit time, whether the actually measured value is within the normal range. If the actually measured value is within the normal range, the detection unit 124 determines that there is no anomaly, and if the actually measured value is not within the normal range, the detection unit 124 determines that there is an anomaly. The detection unit 124 performs anomaly detection by determining whether there is an anomaly by thus using the normal range.

Figure 11:
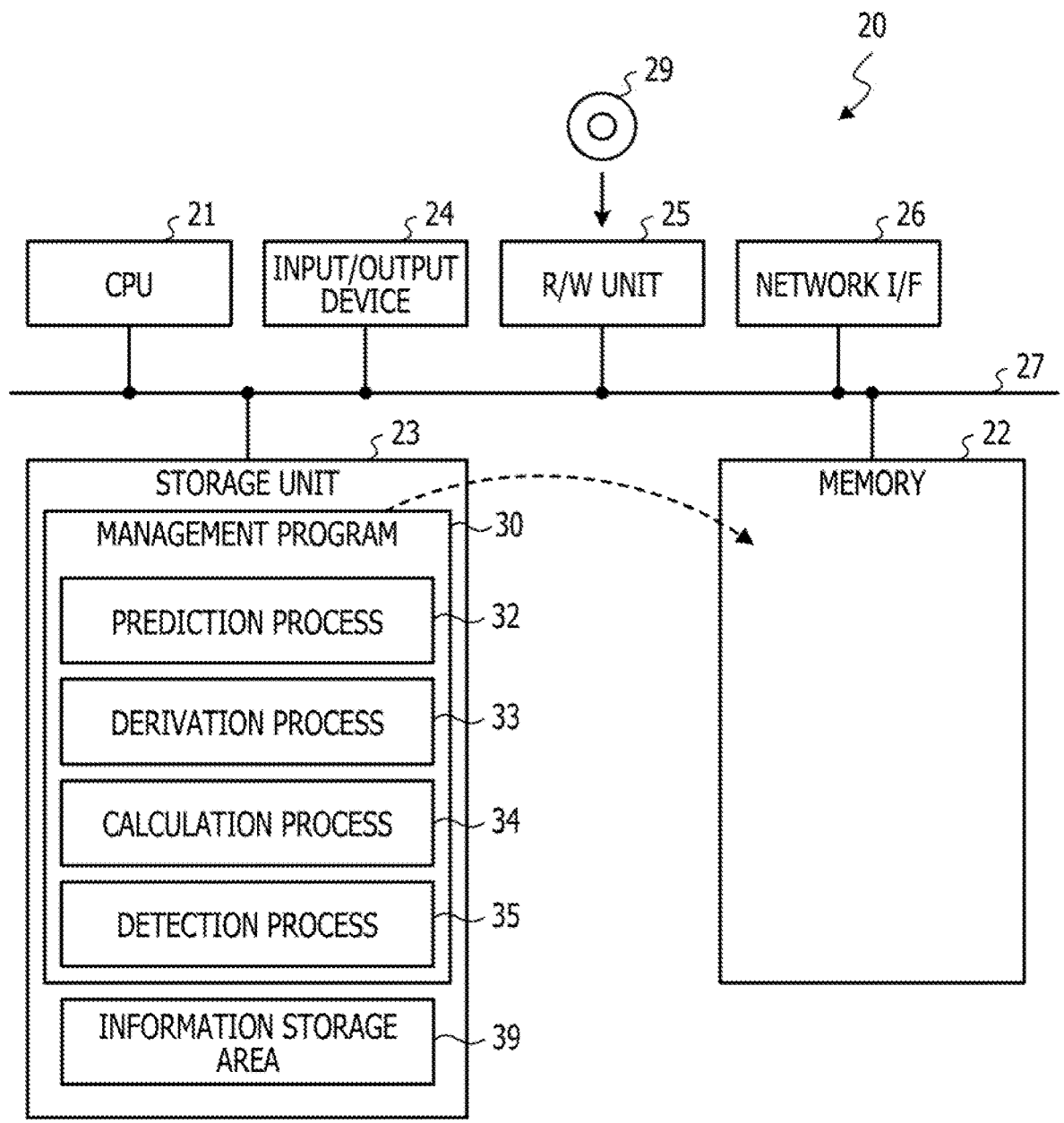
FIG. 11 is a block diagram illustrating a schematic configuration of a computer hat functions as the traffic management device.

The traffic management device 100 can be implemented, for example, by a computer 20 illustrated in FIG. 11. The computer 20 includes a central processing unit (CPU) 21, a memory 22 as a temporary storage area, and a nonvolatile storage 23. Note that the computer 20 also includes an input/output device 24, a read/write (R/W) unit 25 that controls reading and writing of data to and from a storage medium 29, and a communication interface (I/F) 26 connected to a network such as the Internet. The CPU 21, the memory 22, the storage 23, the input/output device 24, the R/W unit 25, and the communication I/F 26 are connected to each other via a bus 27.

The storage 23 can be implemented by a hard disk drive (HDD), a solid state drive (SSD), a flash memory, or the like. The storage 23 as a storage medium stores a management program 30 for causing the computer 20 to function as the traffic management device 100. The management program 30 includes a prediction process 32, a derivation process 33, a calculation process 34, and a detection process 35. Furthermore, the storage 23 has an information storage area 60 for storing information for configuring each of the traffic information storage 112, the prediction information storage 116, and the corrected information storage 120. Note that the management program 30 is an example of an anomaly detection program of the disclosed technique.

The CPU 21 reads the management program 30 from the storage 23, develops the management program 30 in the memory 22, and sequentially executes the processes included in the management program 30. The CPU 21 executes the prediction process 32 so as to operate as the prediction unit 114 illustrated in FIG. 6. Note that the CPU 21 executes the derivation process 33 so as to operate as the derivation unit 118 illustrated in FIG. 6. Furthermore, the CPU 21 executes the calculation process 34 so as to operate as the calculation unit 122 illustrated in FIG. 6. The CPU 21 executes the detection process 35 so as to operate as the detection unit 124 illustrated in FIG, 6, Furthermore, the CPU 21 reads information from the information storage area 39, and develops each of the traffic information storage 112, the prediction information storage 116, and the corrected information storage 120 into the memory 22. This enables the computer 20 that has executed the management program 30 to function as the traffic management device 100. Note that the CPU 21 that executes the program is hardware.

Note that, functions implemented by the management program 30 can also be implemented, for example, by a semiconductor integrated circuit, in more detail, an application specific integrated circuit (ASIC) or the like.

Next, operation of the traffic management device 100 according to the present embodiment will be described. The operation of the traffic management device 100 is divided into correction processing performed before the start of the target period and detection processing performed during the target period. Note that it is assumed that the processing of the prediction unit 114 is performed in advance and the prediction values of each target route are stored in the prediction information storage 116. The correction processing and the detection processing are included in an example of the anomaly detection method of the disclosed technique.

Figure 12:
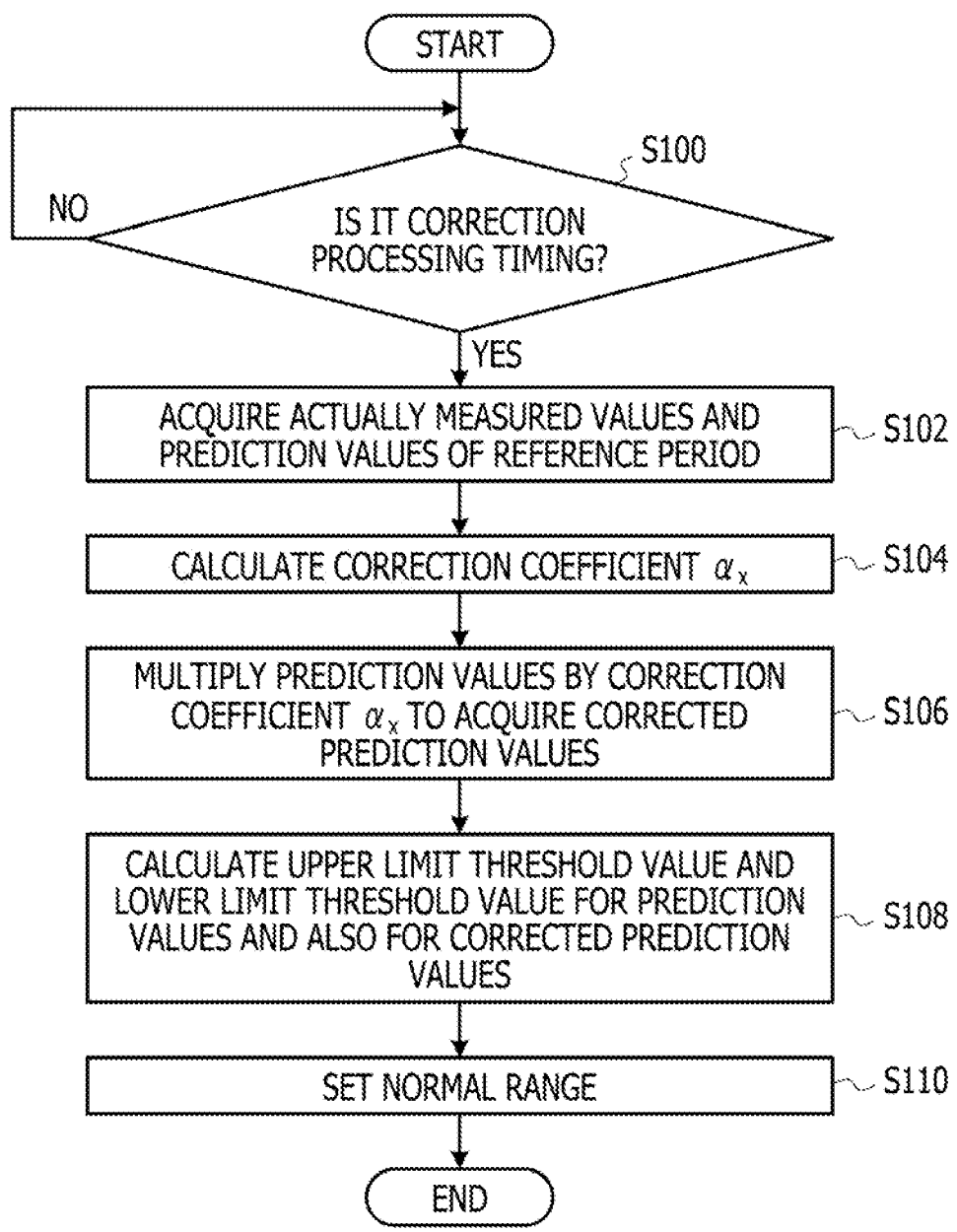
FIG. 12 is a flowchart illustrating an example of correction processing.

The correction processing will be described with reference to the flowchart of FIG. 12. The following correction processing is performed for each target route.

In step S100, the derivation unit 118 determines whether it is the correction processing timing, and if it is the correction processing timing, the processing proceeds to step S102, and if it is not the correction processing timing, step S100 is repeated in a predetermined time interval. The correction processing timing may be set to any time before the start of the target period of the target route for each target route.

In step S102, the derivation unit 118 acquires actually measured values and prediction values of the reference period of the reference day for the target route. The actually measured values are acquired from the traffic information storage 112, and the prediction values are acquired from the prediction information storage 116.

In step S104, the derivation unit 118 calculates the correction coefficient $\alpha_x$ for the target route based on the actually measured values and the prediction values of the reference period of the reference day. The correction coefficient $\alpha_x$ is calculated from the average value of the ratios of the actually measured values to the prediction values each for a unit time of the reference period.

In step S106, the derivation unit 118 multiplies the prediction values of the target period by the correction coefficient $\alpha_x$ for the target route to acquire the corrected prediction values, and stores the corrected prediction values in the corrected information storage 120.

In step S108, the calculation unit 122 calculates, for the target route, the upper limit threshold value and the lower limit threshold value for the prediction values and those for the corrected prediction values for each unit time of the target period.

In step S110, the calculation unit 122 sets the normal range for each unit time of the target period for the target route, and stores the setting of the normal range in the corrected information storage 120. When the normal range is set, based on the upper limit threshold value and the lower limit threshold value for the prediction value and those for the corrected prediction value calculated in step S108, the upper limit threshold value that is higher among those of the prediction value and the corrected prediction value is selected and the lower limit threshold value that is lower among those of the prediction value and the corrected prediction value is selected to define the normal range. As described above, the normal range is defined based on the difference between the prediction values and the corrected prediction values.

Figure 13:
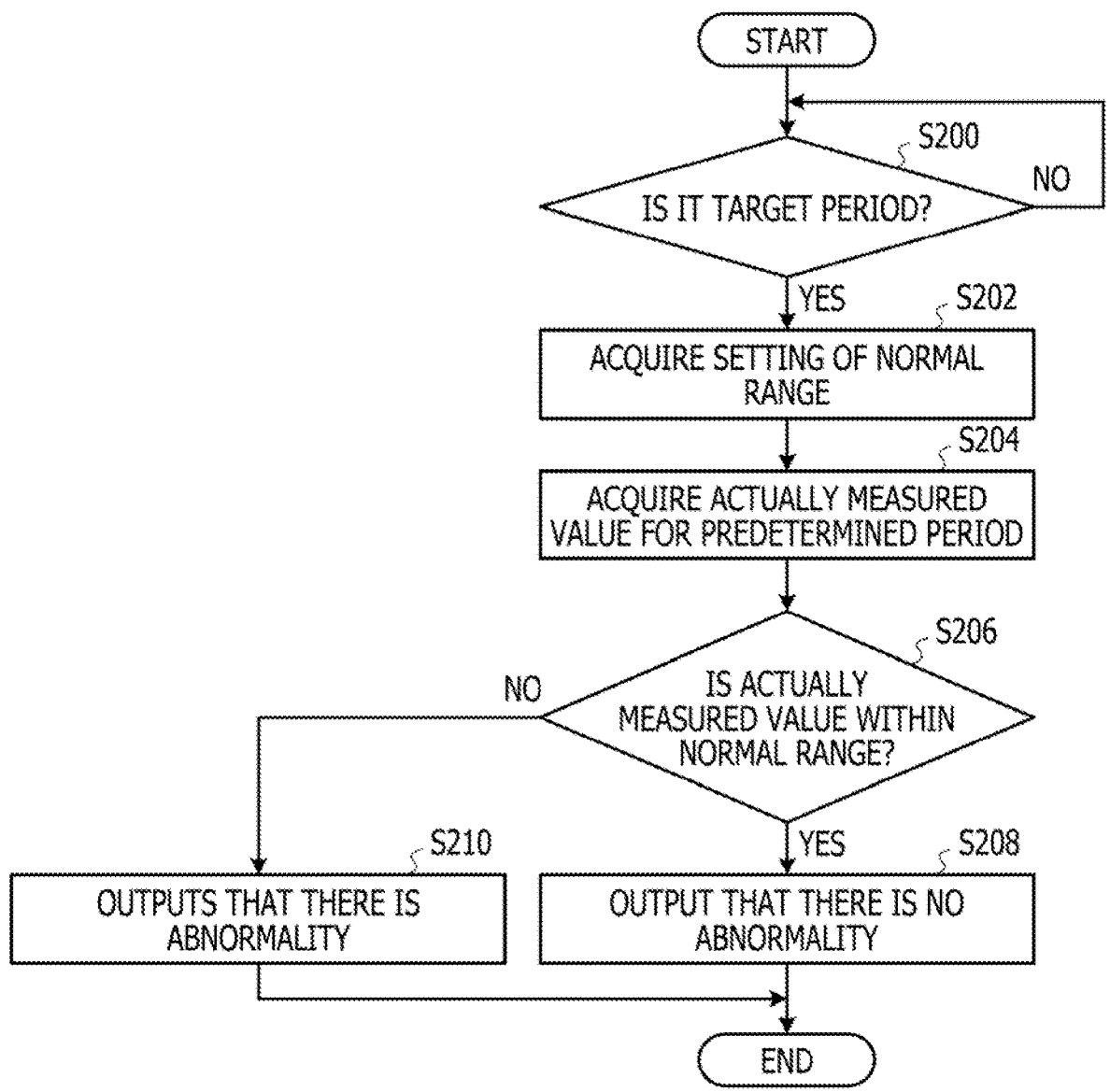
FIG. 13 is a flowchart illustrating an example of detection processing.

Next, the detection processing will be described. The detection processing will be described with reference to the flowchart of FIG. 13. The detection processing is performed every unit time (for example, every 5 minutes, every 10 minutes, etc.) for each target route. In the following, a case where the detection processing is performed for one target route will be described as an example.

In step S200, the calculation unit 122 determines whether the current time is the target period, and proceeds to step S202 if the current time is the target period, and ends the processing if the current time is not the target period.

In step S202, the calculation unit 122 acquires the setting of the normal range of the unit time for the target route. The setting of the normal range is acquired from the corrected information storage 120.

In step S204, the calculation unit 122 acquires, from the traffic information storage 112, the actually measured value for the unit time corresponding to the setting of the setting method for the target route. For example, when the current time is 10:10, the traffic volume at 10:10 is acquired from the traffic information storage 112 as an actually measured value.

In step S206, the detection unit 124 determines whether the actually measured value is within the normal range based on the actually measured value acquired in step S204 and the setting of the normal range acquired in step S202. If the actually measured value is within the normal range, the processing proceeds to step S208, and if the actually measured value is not within the normal range, the processing proceeds to step S210.

In step S208, the detection unit 124 determines that no anomaly has occurred in the actually measured value for the unit time, and outputs that there is no anomaly. In step S210, the detection unit 124 determines that an anomaly has occurred in the actually measured value for the unit time, and outputs that there is an anomaly. Note that the processing of acquiring the actually measured value to detect an anomaly from steps S204 to S210 may be repeatedly performed at intervals shorter than the unit time for performing the detection processing.

The correction processing and the detection processing of the present embodiment have been described above.

Figure 14:
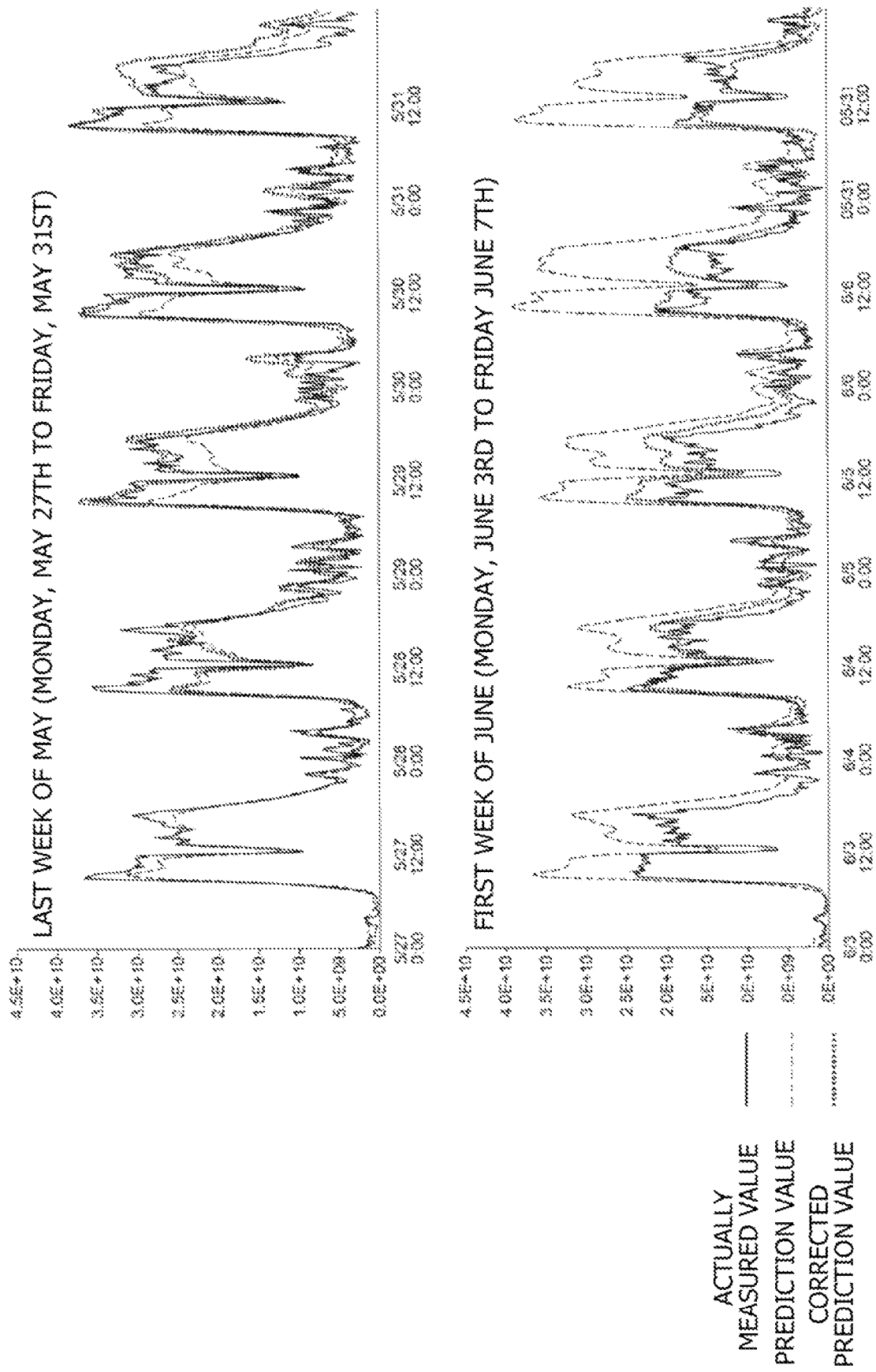
FIG. 14 is a diagram illustrating an experimental example of the method according to an embodiment.

An experimental example of the method according to the present embodiment will be described. FIG. 14 is a diagram illustrating an experimental example of the method according to the present embodiment. In the experimental example illustrated in FIG. 14, the correction coefficient o was reset every week to acquire corrected prediction values for the busy season of the last week of May and the slack season of the first week of June, which is the following month. In this experiment, the corrected prediction values trend to be closer to the actually measured values than the prediction values, and the effectiveness of performing anomaly detection using the corrected prediction value was confirmed.

Figure 15:
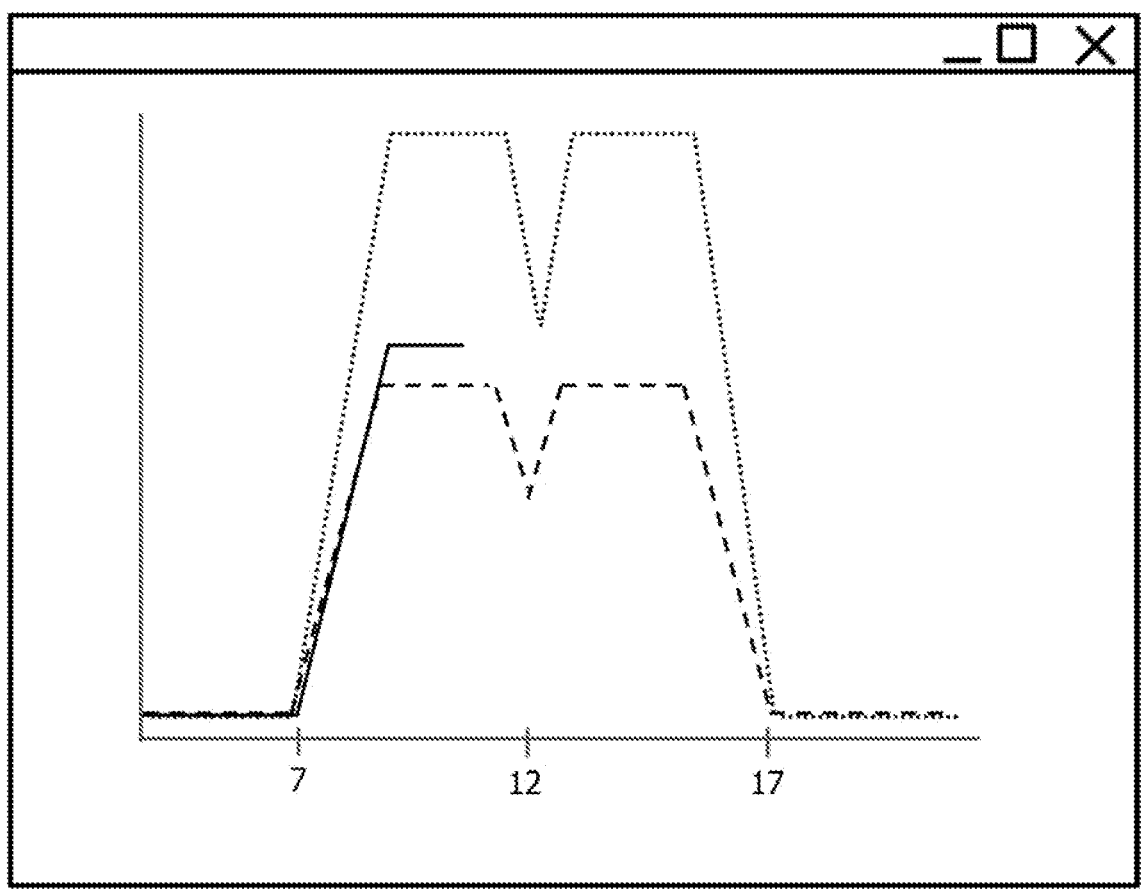
FIG. 15 is a diagram illustrating a screen example indicating the transition of actually measured values of the traffic, upper limit values of the normal range, and lower limit values of the normal range.
Figure 16:
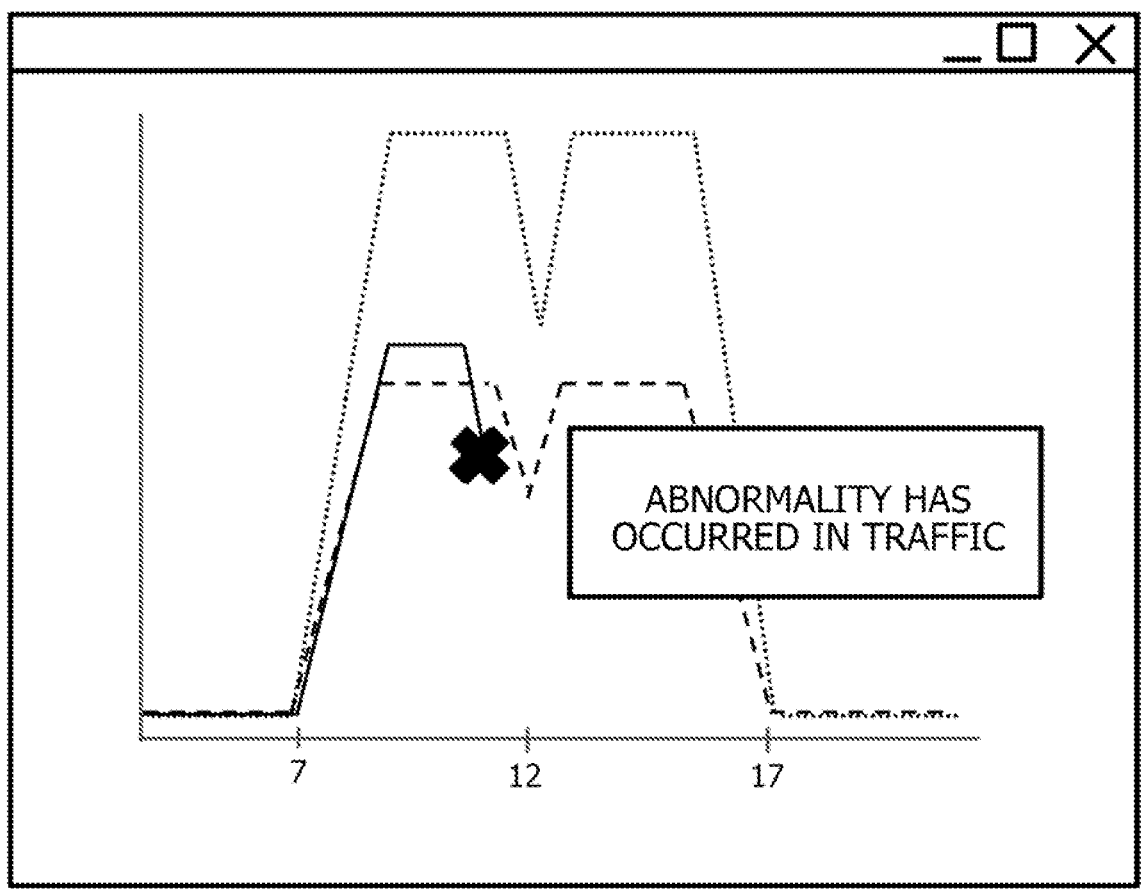
FIG. 16 illustrates a screen example indicating that an anomaly has occurred when the actually measured values fall below the lower limit of the normal range.

Furthermore, an example of a screen on which a network administrator can check the transition of traffic will be described. FIG. 15 is a diagram illustrating a screen example indicating the transition of the actually measured values of the traffic, the upper limit values of the normal range, and the lower limit values of the normal range. As illustrated in the screen example illustrated in FIG. 15, the transition of the actually measured values, the upper limit values of the normal range, and the lower limit values of the normal range are indicated. Thus, it can be monitored whether there is an anomaly in real time. In FIG. 15, the solid line represents the actually measured values, the dotted line represents the upper limit values of the normal range based on the corrected prediction values, and the broken line represents the lower limit values of the normal range based on the prediction values. Furthermore, as illustrated in the screen example illustrated in FIG. 16, when the actually measured values fall below the lower limit of the normal range, a message telling that an anomaly has occurred is displayed.

As described above, the traffic management device 100 according to the present embodiment calculates the correction coefficient $\alpha_x$ based on the actually measured values and the prediction values of the reference period for each target route, and multiplies the prediction values of the target period by the correction coefficient $\alpha_x$ to acquire the corrected prediction values. The traffic management device 100 calculates the normal range for the prediction values and the corrected prediction values. Furthermore, the traffic management device 100 acquires an actually measured value of a predetermined period out of the target period, and detects an anomaly using the normal range. Therefore, it is possible to detect an appropriate anomaly according to a fluctuation that is difficult to predict.

(Modification)

Next, modifications of the present embodiment will be described.

For example, in the above-described embodiment, the case where the correction coefficient $\alpha_x$ is used has been described as an example, but the present disclosure is not limited to the case, and instead of the correction coefficient $\alpha_x$, a correction value $\beta_x$, which is calculated from the difference between the actually measured values and the prediction values of the reference period, may be used. In a case where the correction value $\beta_x$ is used, values acquired by adding the correction value $\beta_x$ to the prediction values are acquired as the corrected prediction values. Furthermore, in this case, differences between the actually measured values and the prediction values are used instead of the ratios. The correction value $\beta_x$ is calculated as an average value calculated using difference values that remain when values included in a predetermined range including the maximum value and values included in a predetermined range including the minimum value are removed from the difference values. Then, corrected prediction values are acquired by adding the correction value $\beta_x$ to prediction values.

Furthermore, the detection of an anomaly may be performed by, for example, calculating an anomaly degree by the following expressions (1-1) and (1-2) using the differences between the actually measured values and the prediction values and the differences between the actually measured values and the corrected prediction values.

first anomaly degree=((actually measured value)−(prediction value))²     (1-1)

second anomaly degree=((actually measured values)−(corrected prediction value))²     (1-2)

The first anomaly degree and the second anomaly degree are compared with threshold values preset respectively, and if either of them is within the threshold values, it is determined that there is no anomaly, and if neither of them is within the threshold values, it is determined that there is an anomaly to perform anomaly detection. In this case, these anomaly degrees are used as references of the present disclosure. Furthermore, the expressions (1-1) and (1-2) may be replaced with the following equations (2-1) and (2-2).

first anomaly degree=(((actually measured value)−(prediction value))/(prediction value))²     (2-1)

second anomaly degree=(((actually measured values)−(corrected prediction value))/(corrected prediction value))²     (2-2)

Furthermore, the corrected prediction value may be acquired by storing the corrected prediction values in a table or the like that defines the relationship between pieces of data of the prediction values, the actually measured values, and the correction coefficients $\alpha_x$ and the corrected prediction values, and reading a corrected prediction value.

Furthermore, the corrected prediction value may be acquired by using a method such as deep learning. When a method such as deep learning is used, a correction model that outputs corrected prediction values is learned using, as learning data, each of the actually measured values acquired in the target period, the prediction values and the corrected prediction values of the target period, and the actually measured values and the prediction values of the reference period. The learning data may be accumulated by the method of the present embodiment for a certain period that is, for example, several weeks. The correction model corresponds to the correction coefficient $\alpha_x$ of the above-described embodiment. The correction model is trained to optimize the differences between the corrected prediction values and the actually measured values. The derivation unit 118 may input the actually measured values and the prediction values of the reference period into the trained correction model, and acquire the corrected prediction values as outputs of the correction model. By using the correction model, it is possible to deal with the trend of traffic fluctuation of the target route.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An anomaly detection method executed by a computer, the anomaly detection method comprising:
    identifying, for each target period of target periods, a prediction value to be a reference for determining whether an anomaly occurs in the target period;
    acquiring a first correction coefficient from a ratio, the ratio being actual measured values of a second target period to a second prediction value of the second target period, the second target period being before a first target period;
    identifying a corrected prediction value by multiplying a first prediction value of the first target period of the target periods by the first correction coefficient;
    setting one of the first prediction value and the corrected prediction value as an upper limit value;
    setting one of the first prediction value and the corrected prediction value as a lower limit value such that the lower limit value is different from the upper limit value;
    monitoring a computer network in the first target period;
    determining whether the anomaly occurs within the computer network in the first target period based on that a first anomaly degree and a second anomaly degree are being between the upper limit value and the lower limit value, the first anomaly degree being a value of a measured value in the first target period minus the first prediction value, the second anomaly degree being a value of the actual measured value in the first target period minus the corrected prediction value;
    determining whether to multiply the first correction coefficient with a third prediction value of a third target period to acquire a third corrected prediction value of the third target period of the target periods, the third target period being after the first target period;
    setting a second upper limit value and a second lower limit value based on the third corrected prediction value and the third prediction value.

2. The anomaly detection method according to claim 1, wherein the anomaly detection method comprising:
    calculating the first correction coefficient by excluding a certain range including a maximum value of plurality of ratios and a certain range including a minimum value of the plurality of ratios.

3. The anomaly detection method according to claim 1, wherein the anomaly detection method comprising:
    setting the reference within a normal range defined by an upper limit threshold value and a lower limit threshold value acquired for each of the first prediction value and the corrected prediction value,
    determining anomaly detection by determining that no anomaly has occurred when measured values are within the normal range, and
    determining that an anomaly has occurred when any of the measured values is not within the normal range.

4. The anomaly detection method according to claim 3, wherein the anomaly detection method comprising
    identifying the normal range based on a difference between the first prediction value and the corrected prediction value.

5. The anomaly detection method according to claim 1, wherein the anomaly detection method comprising
    acquiring the corrected prediction value by referring a target period of a certain day of a previous week.

6. A non-transitory computer-readable storage medium storing a program that causes a computer to execute a process, the process comprising:
    identifying, for each target period of target periods, a prediction value to be a reference for determining whether an anomaly occurs in the target period;
    acquiring a first correction coefficient from a ratio, the ratio being actual measured values of a second target period to a second prediction value of the second target period, the second target period being before a first target period;
    identifying a corrected prediction value by multiplying a first prediction value of the first target period of the target periods by the first correction coefficient;
    setting one of the first prediction value and the corrected prediction value as an upper limit value;
    setting one of the first prediction value and the corrected prediction value as a lower limit value such that the lower limit value is different from the upper limit value;
    monitoring a computer network in the first target period;
    determining whether the anomaly occurs within the computer network in the first target period based on that a first anomaly degree and a second anomaly degree are being between the upper limit value and the lower limit value, the first anomaly degree being a value of a measured value in the first target period minus the first prediction value, the second anomaly degree being a value of the actual measured value in the first target period minus the corrected prediction value;
    determining whether to multiply the first correction coefficient with a third prediction value of a third target period to acquire a third corrected prediction value of the third target period of the target periods, the third target period being after the first target period;

setting a second upper limit value and a second lower limit value based on the third corrected prediction value and the third prediction value.

7. The non-transitory computer-readable storage medium according to claim 6, wherein the process comprising:

calculating the first correction coefficient by excluding a certain range including a maximum value of plurality of ratios and a certain range including a minimum value of the plurality of ratios.

8. The non-transitory computer-readable storage medium according to claim 6, wherein the process comprising:

setting the reference within a normal range defined by an upper limit threshold value and a lower limit threshold value acquired for each of the first prediction value and the corrected prediction value, determining anomaly detection by determining that no anomaly has occurred when measured values are within the normal range, and determining that an anomaly has occurred when any of the measured values is not within the normal range.

9. The non-transitory computer-readable storage medium according to claim 8, wherein the process comprising:

identifying the normal range based on a difference between the first prediction value and the corrected prediction value.

10. The non-transitory computer-readable storage medium according to claim 6, wherein the process comprising acquiring the corrected prediction value by referring a target period of a certain day of a previous week.

\* \* \* \* \*